United States Patent [19]
Rigden

[11] 3,748,595
[45] July 24, 1973

[54] HELIUM-CADMIUM LASER AND METHOD FOR OPTIMUM OPERATION

[75] Inventor: Jameson Dane Rigden, Westport, Conn.

[73] Assignee: The Perkin-Elmer Corporation, Norwalk, Conn.

[22] Filed: Mar. 6, 1970

[21] Appl. No.: 17,212

[52] U.S. Cl. .................................. 331/94.5, 330/4.3
[51] Int. Cl. ............................................. H01s 3/22
[58] Field of Search ...................... 331/94.5; 330/4.3

[56] References Cited
UNITED STATES PATENTS
3,621,460  11/1971  Willett ............................. 331/94.5
3,464,025   8/1969  Bell ................................. 331/94.5

Primary Examiner—Williams L. Sikes
Attorney—Edward R. Hyde, Jr.

[57] ABSTRACT

Means for introducing cadmium vapor into a helium laser tube and for maintaining optimum vapor pressure are disclosed in the form of a steel jacketed hollow cadmium cylinder mounted coaxially within the laser tube between the anode and cathode, and surrounded by an evacuated bulb. Plasma discharge of the ionized helium gas passes through and heats the hollow cadmium cylinder to produce cadmium vapor, thus eliminating any need for an auxiliary heater. A method of selecting and adjusting the plasma discharge current to optimum value is also disclosed.

5 Claims, 4 Drawing Figures

PATENTED JUL 24 1973 3,748,595
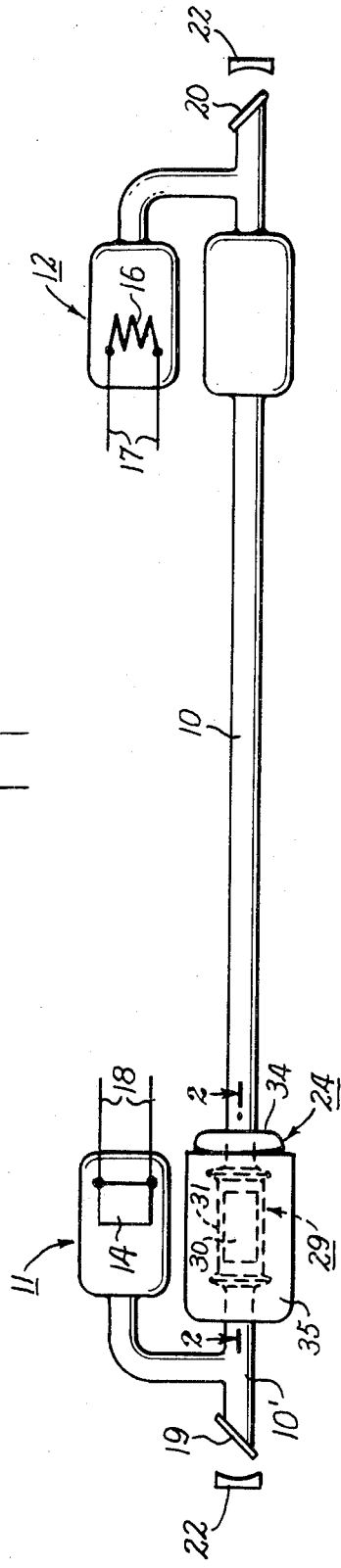
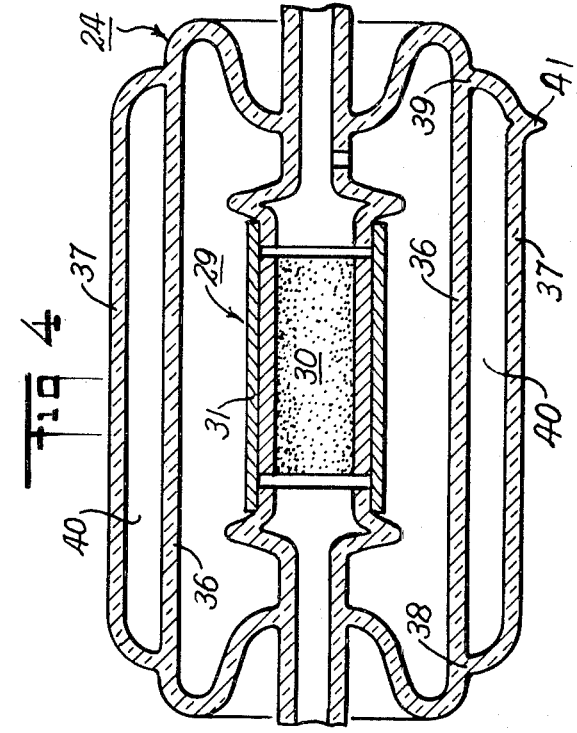
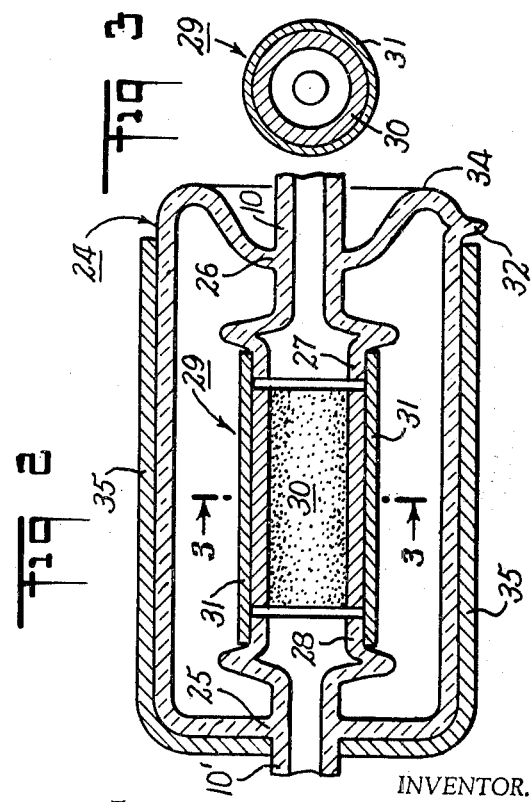
INVENTOR.
*Jameson Dane Rigden*
BY
*Robert A. Buckles*
ATTORNEY

HELIUM-CADMIUM LASER AND METHOD FOR OPTIMUM OPERATION

BACKGROUND OF THE INVENTION

The need for efficient low cost blue light laser sources has been recognized for some time. Heretofore ultraviolet lasers have been developed employing argon or neon in a highly excited state, requiring high input power and costly equipment. More recently helium-cadmium lasers have been announced by Bell Telephone Laboratories (Electronic Design News July 1, 1969, p. 22) and by the RCA Corporation (RCA Review Sept. 1969, pp. 422-428). In thises helium-cadmium lasers it is necessary to produce and maintain a partial pressure of approximately two microns of cadmium vapor pressure in a helium buffer which is maintained at a pressure of several torr. The excitation of the cadmium is produced by penning collisions between helium metastables and ground state cadmium atoms.

The exact pressure of cadmium vapor is quite critical for stable lasing action. In the prior art this cadmium vapor is pro-duced by applying external heat to metal pellets contained in one or more evaporator chambers connected with the helium laser tube. The critical vapor pressure required has been maintained in the prior art devices by means of servo temperature control of the evaporator heater to a necessary accuracy of better than $\pm 1°C$. Experience has shown that this means of vapor pressure control is difficult to achieve, requires expensive mechanisms and has an undesirably long time lag constant. In practice with the prior art techniques too much cadmium vapor is often produced, with the consequent danger of coating sensitive optical surfaces such as windows and mirrors with condensed metal vapor, and the discharge becomes quite unstable, a condition known in the art as the "blue meanies."

OBJECTS OF THE INVENTION

A principal object of the present invention is to overcome the problems and difficulties inherent in the prior art as described above.

A more particular object is to provide a simplified, self-regulating helium-cadmium laser which does not require external heat regulating means.

Another object of the invention is to provide helium-cadmium lasers which are less expensive to manufacture, and more reliable and stable in operation.

An additional object of the invention is to provide a method of selecting the proper value of discharge current to achieve optimum laser operation.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawing, in which:

FIG. 1 is a overall front view of a preferred embodiment of a laser according to the invention, with the metal vapor generator portion shown in broken lines;

FIG. 2 is an enlarged cross-sectional view of the metal vapor generator portion taken along the line 2—2 of FIG. 1;

FIG. 3 is an axial cross-sectional view taken along the line 3—3 of FIG. 2; and

FIG. 4 is a cross-sectional view of an alternative embodiment of the invention wherein the cadmium evaporation chamber is surrounded by and enclosed within a Dewar vacuum bulb.

DESCRIPTION OF THE INVENTION

Referring now to FIG. 2 of the drawing it will be seen that the laser of the invention comprises an elongated linear discharge tube 10-10' which may be formed of glass with enlarged anode and cathode chambers 11 and 12 near the opposite ends thereof. Chamber 11 contains a metallic anode 14, while chamber 12 contains a corresponding cathode 16. Cathode 16 is heated by a filamentary heater winding and energized through a pair of conductors 17 (FIG. 1A) brought out through a seal in the glass envelope of chamber 12. Positive potential is applied to anode 14 via a conductor 18 sealingly passed through the cylindrical envelope of chamber 11. Planar windows 19 and 20 are sealingly affixed to the opposite ends of discharge tube 10-10' at Brewster's angle, in the manner well known in the art. Aligned spherical mirrors 21 and 22 are mounted outside the window 19 and 20 with their central axes in exact alignment with the longitudinal axis of discharge tube 10 to reflect light waves generated by the gaseous discharge back into tube 10 and along the longitudinal axis thereof to generate laser action, all as well known in the art. One of the mirrors 21-22 is normally semitransparent to allow passage of a portion of the laser beam generated within tube 10-10' for use outside the tube.

Mounted on and surrounding discharge tube 10-10' near the anode chamber 11 is a cylindrical evaporation chamber indicated generally at 24 in FIG. 1. Chamber 24 is hermetically sealed to the coaxially aligned discharge tube portions 10' and 10 by annular seals 25 and 26 as shown in FIG. 1. Within chamber 24 between the inner end 27 of discharge tube 10 and the inner end 28 of discharge tube extension 10' is mounted, coaxially with the longitudinal axis of discharge tube 10-10', a hollow cylindrical metallic member indicated generally at 29. The metallic member 29 comprises an inner hollow cylinder 30 formed of cadmium, surrounded by an outer cylindrical jacket 31 formed of stainless steel. The steel jacket 31 is made somewhat longer than the hollow cadmium cylinder 30, and the inner diameter of steel jacket 31 is slightly larger than the outer diameter of ends 27 and 28 of discharge tube portions 10 and 10' respectively, whereby the combined hollow metallic cylinders 30 and 31 are supported by, and coacially with, the discharge tube sections 10 and 10'. When thus assembled and sealed, the entire laser tube structure is evacuated through a tit 32 on the annularly extending sealed portion 34 of chamber 24, and then the evacuated tube is back-filled with helium gas at a suitable pressure which may be of the order of one or more torr.

The dimensions of the cadmium cylinder 30 are chosen empirically to match the bore of the laser discharge tube 10. I have found that with a tube bore of 2.7 mm and a total plasma length of 50 cm. a cadmium cylinder 1 inch long and having an inside diameter of three-eighth inch works fune to produce laser light at 4,416 A. A laser built according to these specifications has been found to last quite stably with a plasma current ranging from 100 milliamperes to over 150 milliamperes, and to produce 30 milliwatts of 4,416 A light at 135 milliamperes. I have found it desirable, however, to insulate the cadmium evaporation chamber 24 from air drafts to prevent the evaporation temperature from fluctuating. For this purpose I wrap a layer 35 (FIG. 1) of asbestos around the exterior of the chamber bulb 24. No doubt other heat insulating materials may be employed in lieu of asbestos, or this insulation may be provided by surrounding the evaporation chamber 24 with an integrally formed evacuated Dewar bulb as shown in FIG. 4.

Referring now to FIG. 4 of the drawings, the cadmium evaporation chamber 24 is constructed in substantially the same manner as described hereinabove with reference to FIG. 2. In this embodiment, however, the external cylindrical wall 36 of the evaporation chamber 24 is surrounded by a larger diameter cylindrical wall 37 the ends of which are sealed to wall 36 by annular seals 38 and 39, forming an enclosed and hermetically seealed substantially cylindrical space 40 between walls 36 and 37 and surrounding the chamber 24. The inner surfaces of annular chamber 40 may be silvered in the manner employed in the manufacture of vacuum bottles, and then a vacuum is drawn within chamber 40 through an external tit seal 41.

With the structures hereinabove described the application of suitable operating potential, which I have found to be of the order of 2,000 volts to produce a constant discharge current of at least 100 milliamperes, the plasma discharge passes through the hollow cylindrical core of the cadmium cylinder 30 on its way to the cathode 16. The cylinder 30 is heated by the plasma and consequently releases cadmium vapor into the plasma. The process of vapor release, and the resulting vapor pressure of cadmium in the plasma, is partially self-regulating and remains a constant for any given discharge current. This self-regulation is believed to result from the fact that plasma containing cadmium vapor has a lower impedance than plasma without cadmium and hence, with a constant current supply, any increase in cadmium vapor pressure reduces the amount of heat dissipated into the cadmium cylinder, with a consequent automatic reduction in cadmium vapor release. This inherent self-regulation of cadmium vapor pressure in the structure described has a shorter time constant than when an external heater is used and produces a much more stable helium-cadmium laser than has heretofore been obtainable with the more complicated and costly external servomechanisms employed for regulation of an auxiliary heater.

A further advantage of the helium-cadmium laser structure disclosed is that it provides a simple means for determining and controlling operation of the laser at optimum cadmium vapor pressure. A small modulation of the discharge tube current produces (in general) a modulation on the laser light at 4,416 A. If the laser light modulation is in phase with the tube current modulation, then the cadmium vapor pressure is too high and the laser is not operating at maximum efficiency. In this case the value of the discharge current should be reduced to reduce the cadmium vapor release. On the other hand, if the laser light modulation appears 180 degrees out of phase with the current discharge modulation, then the cadmium vapor pressure is too low and the discharge current should be increased to achieve more cadmium vapor release. If desired, a servo control may be employed to adjust the discharge tube current in response to automatic sensors responsive to the above described modulation characteristics. Once the optimum discharge current has been determined in this manner, the proper constant operating current may be recorded on the name plate of each manufactured laser so that the purchaser may always be enabled to obtain optimum performance without further testing or experimentation.

While the example given herein is for a laser working at 4,416 A, it is to be understood that the structures disclosed may be modified within the skill of the art to adapt the invention to lasers operable at other frequencies, as for example an ultraviolet laser at 3,250 A may be produced also using a hollow cadmium cylinder installed in the plasma discharge path as shown in the drawings. It is also to be understood that lasers utilizing other metal vapors may employ the self-heating and self-regulating features of the structure which comprises the heart of my invention.

It will thus be seen that the objects set forth above, among those made apparent from the proceding description, are efficiently attained and, since certain changes may be made in the above construction without departing from th scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. In an optical laser tube employing helium gas and a metallic vapor as the active medium, means for introducing metal vapor into the gas plasma comprising, a hollow cylindrical tube formed of the metal to be vaporized, a cylindrical steel jacket surrounding said hollow tube, and means for mounting said steel jacketed hollow metal tube in coaxial relation within said laser tube, whereby plasma generated by the application of electrical power to said laser tube passes through the axial bore of said hollow metal tube imparting heat thereto and partially vaporizing metal therefrom.

2. The combination of claim 1 wherein electrical power is applied to said laser tube from a constant current source whereby heating of the metallic cadmium produces cadmium vapor which combining with the helium gas reduces the electrical impedance thereof, thereby reducing the heat dissipated by the constant current discharge to effectively self-regulate the production of cadmium vapor.

3. In a helium-cadmium optical laser tube, means for introducing a partial pressure of cadmium vapor into a helium buffer within the laser tube comprising, a hollow cadmium cylinder having an axial bore therethrough, and means supporting said hollow cadmium cylinder with its axial bore coaxial within said laser tube, whereby plasma of said helium buffer passes through the axial bore of said hollow cadmium cylinder thereby heating and vaporizing cadmium from said cylinder into said helium buffer, and a forced fitting stainless steel cover tube encircling said hollow cadmium cylinder to prevent vaporization except from the internal axial bore of said cadmium cylinder.

4. In a helium-cadmium laser the method of selecting a critical value of constant discharge current for optimum laser operation which comprises the steps of
 A. applying modulation to the laser tube current to produce a modulation on the laser light,
 B. comparing the phase relation between the modulations of tube current and the modulation of laser light,
 C. increasing the tube current if the modulations are 180° out of phase, and
 D. decreasing the tube current if the modulations are in phase.

5. A helium-cadmium laser comprising in combination,
 A. an elongated laser tube having a straight line central longitudinal axis,
  1. a pair of transparent planar windows sealingly mounted at opposite ends of said laser tube,
   a. said windows mounted at Brewster's angle,
  2. a coaxial anode sealingly mounted within an enlarged portion of said laser tube adjacent one end thereof,
  3. a coaxial cathode sealingly mounted within an enlarged portion of said laser tube adjacent the opposite end thereof,
  4. an enlarged cylindrical chamber sealingly mounted to and surrounding said laser tube at a position between said anode and cathode, in closer proximity to said anode,
   a. a hollow metallic cylinder of cadmium inserted in said laser tube and within said enlarged cylindrical chamber, coaxial with the longitudinal central axis of said laser tube,
   b. a close fitting stainless steel cylindrical tube surrounding the outer surface of said hollow cadmium cylinder,
   c. insulating means surrounding the outer surface of said enlarged cylindrical chamber,
  5. helium gas under pressure within said lase tube and,
 B. a pair of concave spherical mirrors positioned at opposite ends of said laser tube in proximity to said planar windows and having the centers of their spherical surfaces normal to the longitudinal central axis of said laser tube.

* * * * *

UNITED STATES PATENT OFFICE
CERTIFICATE OF CORRECTION

Patent No. 3,748,595              Dated July 24, 1973

Inventor(s) Jameson Dane Rigden

It is certified that error appears in the above-identified patent and that said Letters Patent are hereby corrected as shown below:

Column 1, line 13, "thises" should be --these--; line 24, "pro-duced" should be --produced--; line 65, "a" (first occurrence) should be --an--. Column 2, line 12, after "now to" insert --FIG. 1 and--; line 28, "window" should be --windows--; line 56, "coacially" should be --coaxially--. Column 3, line 1 "fune" should be --fine--;

line 3, "last" should read -- lase --; line 16, "drawings" should be -- drawing --; line 24, "seealed" should read -- sealed --. Column 6, line 17, "lase" should read -- laser --.

Signed and sealed this 8th day of January 1974.

(SEAL)
Attest:

EDWARD M. FLETCHER, JR.           RENE D. TEGTMEYER
Attesting Officer                  Acting Commissioner of Patents